United States Patent
Sørensen (10) Patent No.: US 7,082,722 B1
(45) Date of Patent: Aug. 1, 2006

(54) METHOD AND APPARATUS FOR MAKING AN ELONGATE SPINDLE MEMBER OF CHAIN LINKS FOR TRANSFER OF PRESSURE AND TENSILE LOADS

(75) Inventor: Jens Jørren Sørensen, Copenhagen (DK)

(73) Assignee: VKR Holding A/S, Soeborg (DK)

( * ) Notice: Subject to any disclaimer, the term of this patent is extended or adjusted under 35 U.S.C. 154(b) by 0 days.

(21) Appl. No.: 09/647,994

(22) PCT Filed: Mar. 25, 1999

(86) PCT No.: PCT/DK99/00171

§ 371 (c)(1), (2), (4) Date: Dec. 5, 2000

(87) PCT Pub. No.: WO99/53221

PCT Pub. Date: Oct. 21, 1999

(30) Foreign Application Priority Data

Apr. 8, 1998 (DK) .................................. 1998 0512

(51) Int. Cl.
*E06B 3/00* (2006.01)
*E05F 11/00* (2006.01)

(52) U.S. Cl. .......................... 49/506; 49/324; 49/325; 59/1

(58) Field of Classification Search ................ 59/1, 59/8, 12, 20, 25, 26, 35.1; 49/506, 324, 325, 49/356

See application file for complete search history.

(56) References Cited

U.S. PATENT DOCUMENTS

| | | | |
|---|---|---|---|
| 979,110 A * | 12/1910 | Ungerer ........................... 59/1 |
| 1,808,273 A * | 6/1931 | Webb et al. ................... 16/198 |
| 2,131,261 A | 9/1938 | Aldeen et al. |
| 2,832,590 A * | 4/1958 | Youngberg .................... 49/325 |
| 4,397,145 A | 8/1983 | Reist |
| 4,521,993 A | 6/1985 | Tacheny et al. |
| 4,651,517 A * | 3/1987 | Benhamou et al. ............ 59/80 |
| 4,819,495 A * | 4/1989 | Hormann ................... 74/424.6 |
| 4,934,135 A * | 6/1990 | Rozenwasser ................ 59/80 |
| 4,941,316 A * | 7/1990 | Bechtold ........................ 59/78 |
| 5,271,182 A * | 12/1993 | Greisner et al. .............. 49/325 |
| 5,355,643 A * | 10/1994 | Bringolf ...................... 52/108 |
| 5,911,677 A * | 6/1999 | Kupelian .................... 59/35.1 |
| 6,530,177 B1 * | 3/2003 | Sorensen ..................... 49/325 |

FOREIGN PATENT DOCUMENTS

| | | |
|---|---|---|
| DE | 4418876 A1 | 1/1996 |
| EP | 0301453 A1 | 7/1988 |
| WO | WO 97/11283 | 3/1997 |
| WO | WO 97/38928 | 10/1997 |

\* cited by examiner

*Primary Examiner*—Gregory J. Strimbu
(74) *Attorney, Agent, or Firm*—Merek, Blackmon & Voorhees (57) ABSTRACT

An elongate spindle member having rigidity and stability against pressure and tensile loads as well as bending and torsional loads is made by winding-up a plurality of mutually interlocking chain links (1, 12), during axial advancement of the chain links, into a helical winding (5, 16) by a winding guide (14). The elongate spindle member, formed by the helical winding, extends between two objects, one of which is connected with the winding guide (14). The first turn of the helical winding is connected with a coupling member for connection with the other of the two objects. The helical winding is formed by drivingly connecting the chain links to a rotatable driving device in the winding guide and retaining each chain link in engagement with neighboring links in the same turn as well as adjacent chain links in neighboring turns.

44 Claims, 11 Drawing Sheets

METHOD AND APPARATUS FOR MAKING AN ELONGATE SPINDLE MEMBER OF CHAIN LINKS FOR TRANSFER OF PRESSURE AND TENSILE LOADS

TITLE OF THE INVENTION

A method and an apparatus for transfer of pressure and/or tensile load.

BRIEF SUMMARY OF THE INVENTION

The present invention relates to a method and an apparatus for transfer of pressure and/or tensile load between two objects.

According to the invention a transfer of pressure and/or tensile and possibly torque loads between two mutually movable objects is provided, which is suitably applicable for a number of practical purposes and based on hitherto unknown mechanical principles. Non-exhaustive examples of fields of use aimed at by the invention may be raising/lowering devices for mutually height displaceable objects, for instance jacks or motor-operated lifting devices of any kind, and operator mechanisms for the opening and closing of windows, doors and gates.

The method according to the invention is characterized in that an elongate spindle member with high rigidity and stability against pressure and/or tensile load as well as bending and torsional load is provided by winding-up of mutually interlocking chain links under axial displacement in a helical winding by means of a winding guide means connected with one of said two objects and a driving device, a coupling member being provided for connection of the helical winding with the other of said two objects, each chain link being retained in engagement with neighbouring links in the same turn as well as adjacent chain links in neighbouring turns.

The method according to the invention comprises the steps of winding-up of a plurality of mutually interlocking chain links under axial displacement in a helical winding to form said elongate spindle member, using chain links formed with a substantially circular curvature on their exterior sides and including associated engagement means, drivingly connecting said chain links to a rotatable driving device arranged in a winding guide means connected with one of said two objects, guiding said chain links during rotation of said driving device in said winding guide means so that the chain links are interconnected and retained in engagement by their associated engagement means with neighboring chain links in the same turn as well. as adjacent chain links in neighboring turns of said elongate spindle member, and coupling the helical winding with the other of said two objects by means of a coupling member.

According to a preferred embodiment of the method of the invention a reversibly rotatable driving device is used, said device increasing by rotation in one direction of rotation the length of the spindle device during winding of the chain links in said helical winding and reduces by rotation in the opposite direction of rotation the length of the spindle device during unwinding of the chain links from said helical winding.

Further embodiments of the method and non-exhaustive examples of its application are also described herein.

For carrying out the method the apparatus according to the invention is characterized in comprising, in connection with one of said two objects, a chain storage with an elongate chain of interlocking chain links, a guide means for advancing the elongate chain, and a winding guide means connected with the advancing guide means for winding said helical winding and comprising a guide for engagement with a guide member on the chain links, whereas a coupling member is provided for connection of said helical winding with the other of said two objects, a driving means being provided for axial advancement of the spindle device produced by the helical winding.

Advantageous embodiments of the apparatus and its individual components as well as non-exhaustive examples of use are described herein.

BRIEF DESCRIPTION OF THE SEVERAL VIEWS OF THE DRAWINGS

The invention will be explained in the following by means of an embodiment and with reference to the partly schematic drawing, in which.

DETAILED DESCRIPTION OF THE INVENTION

Figure 1:
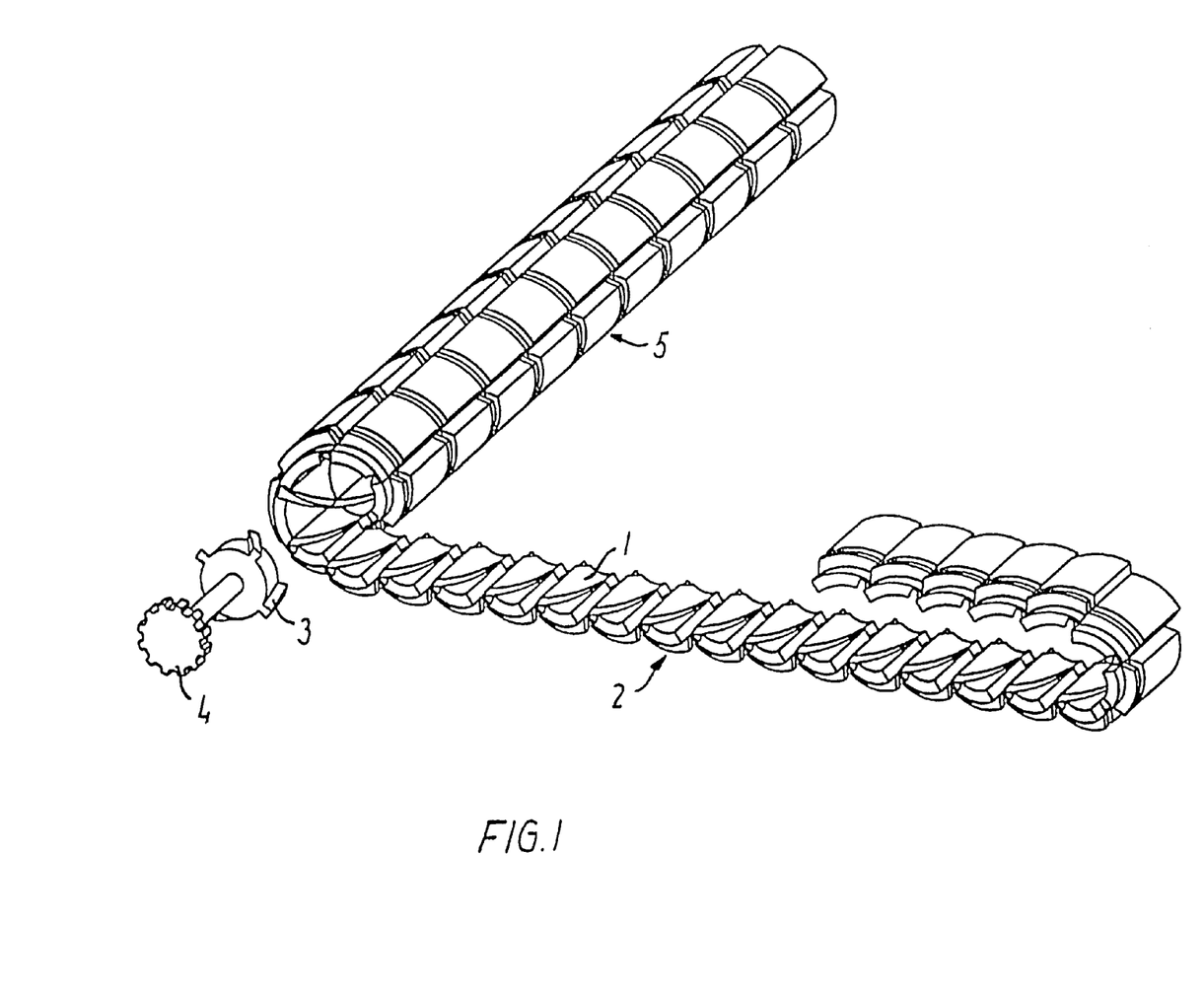
FIG. 1 is a schematic, exploded, perspective view illustrating the principle of the method according to the invention.
Figure 2:
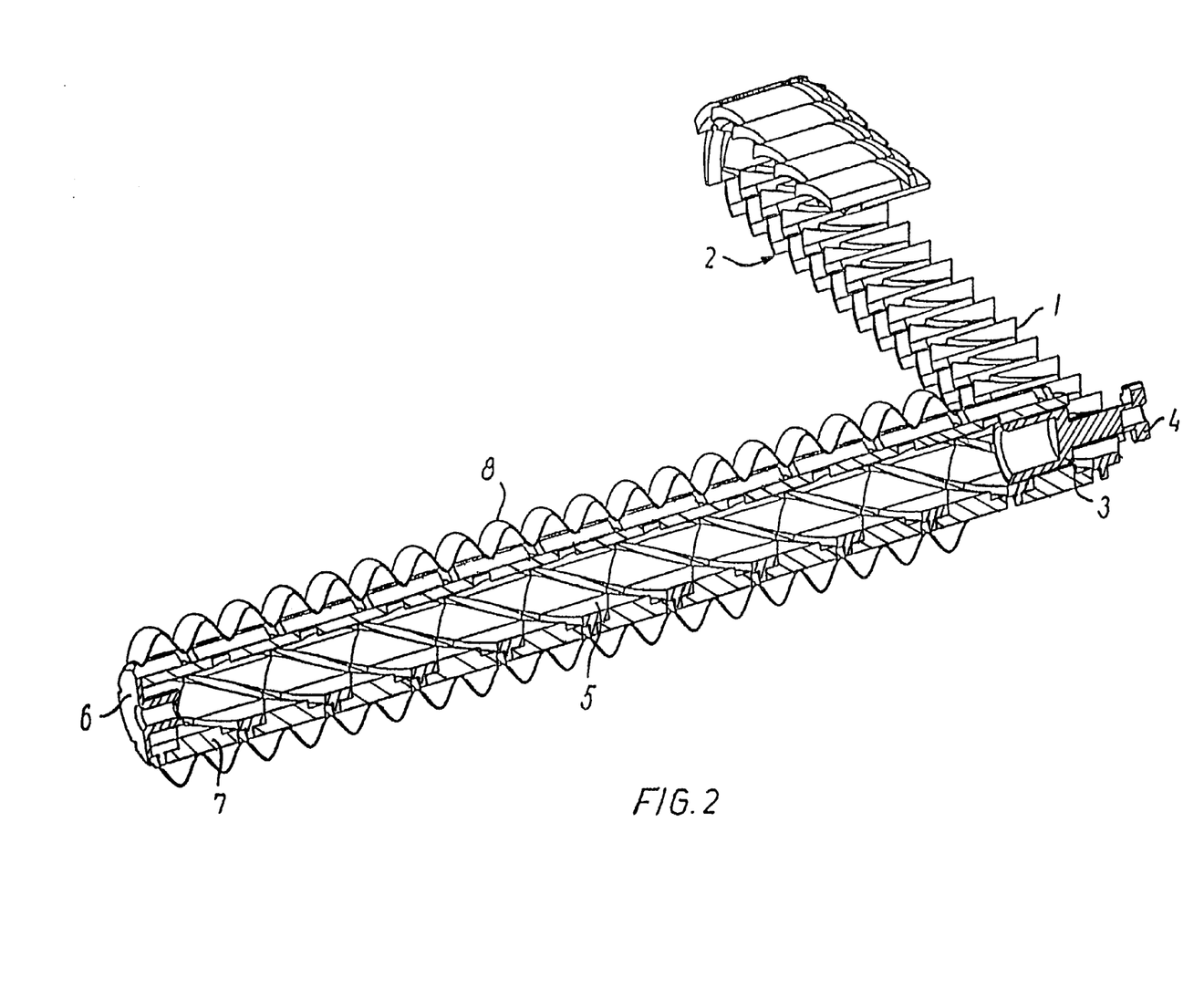
FIG. 2 is a schematic, perspective view, with parts in section, illustrating the principle of the method according to the invention.

As will appear from FIGS. 1 and 2, the invention resides in its broadest aspect in that chain links 1, which are mutually interlocked into an elongate chain 2, are wound into a helical winding 5 under mutual retainment by means of a drive means comprising an advancing wheel 3 in connection with a drive wheel 4 which may be connected via a transmission with a preferably reversibly rotatable drive motor (not shown), and by use of advancing and winding guide means.

The wound up helical winding thereby forms a spindle device of variable length and considerable rigidity and stability against pressure, tensile, bending and torsional loads.

The winding up of the chain links 1 in the helical winding 5 takes place during rotation of the drive wheel 4 in one direction of rotation, the length of the spindle device being increased under axial advancement and simultaneous rotation of the helical winding. If the direction of rotation of the drive wheel 4 is reversed, the chain links 1 will again become unwound from the helical winding 5 and the spindle device formed thereby will be shortened.

When carrying out the method, a chain storage (not shown in FIGS. 1 and 2) will be provided, together with advancing and winding guide means (not shown) and the driving device in connection with one of the two objects, between which a power transfer is wanted, preferably a stationary first object, while a second object movable relative thereto may be connected, as shown in the intersected view in FIG. 2, with the spindle device 5 by means of a coupling member 6, which at the start of the winding up of the chain links 1 is connected with the turn 7 first formed in the helical winding 5.

As will likewise appear from FIG. 2, the spindle device formed by the helical winding 5 will for many practical uses be protected by a surrounding, elongate cover member of variable length, for instance a bellow 8.

Based on the embodiment shown in FIGS. 3 and 4 of an apparatus according to the invention examples of the design of the individual components of the apparatus will be explained in the following.

Figure 3:
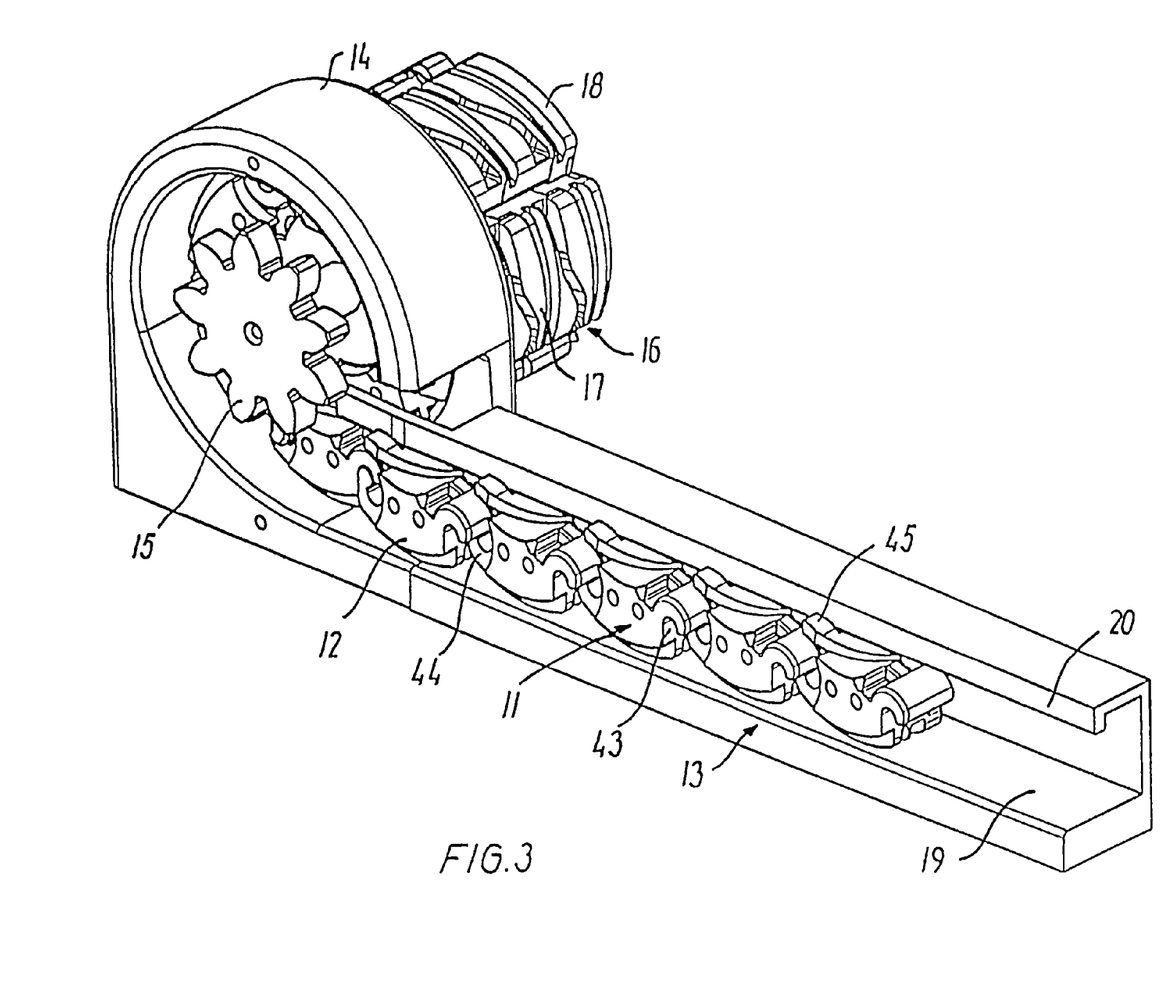
FIG. 3 is a perspective view from the front, top and right side of a first embodiment of an apparatus according to the invention.
Figure 4:
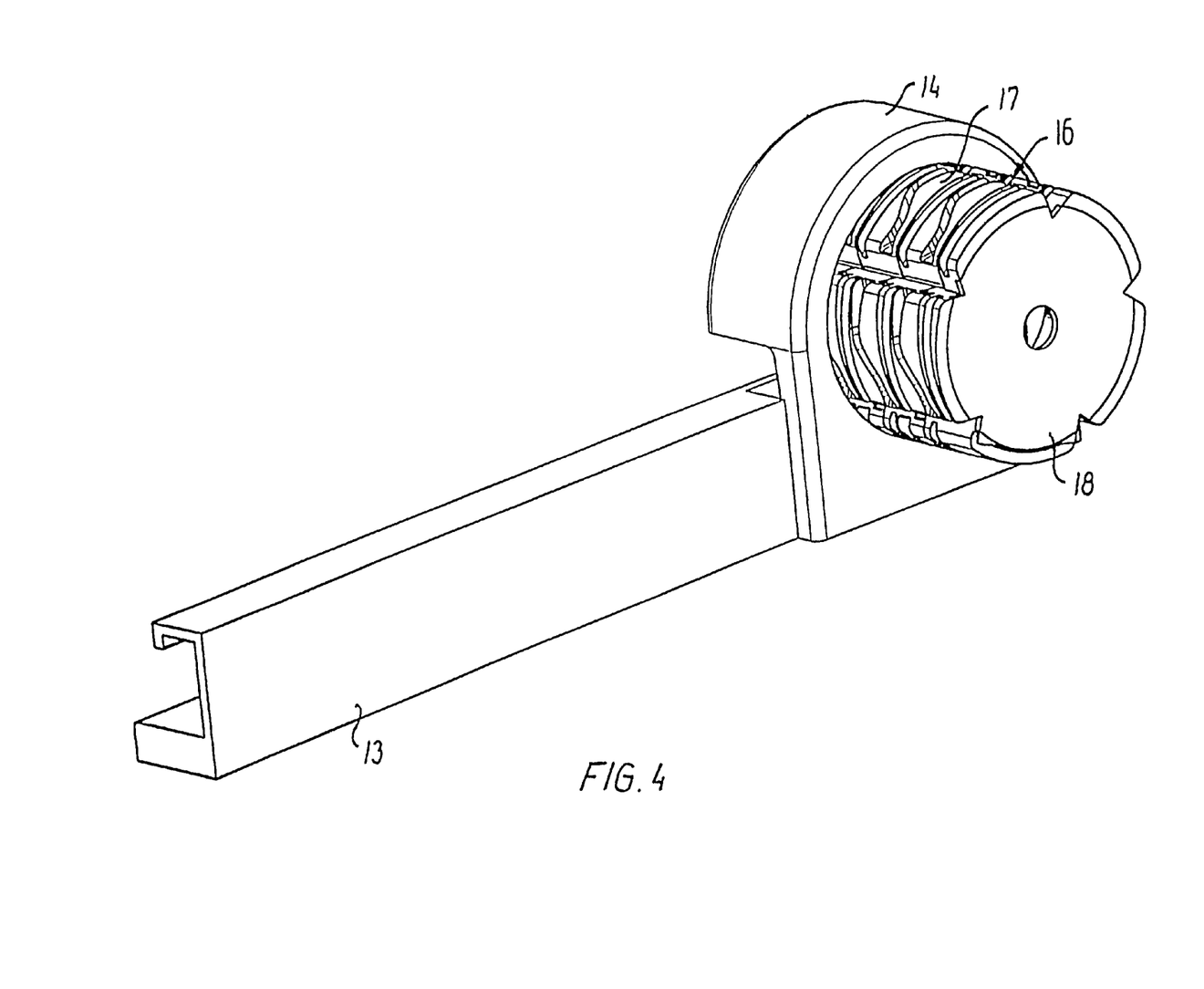
FIG. 4 is a perspective view from the rear, top and right side of the embodiment of FIG. 3.

In the embodiment shown in FIGS. 3 and 4, the mutually interlocked chain links 12 are advanced in an elongate chain 11 from a chain storage (not shown) by means of a substantially linear advancing guide member 13 towards a winding guide member 14, in which the drive means with the drive wheel 15 and the advancing wheel (not shown) are journalled by means of bearing means (not shown).

By clockwise rotation of the drive wheel 15, the chain links 12 are wound, guided by the winding guide means 14, in the helical winding 16, in which the chain links 12 are positioned in closely packed turns 17 under mutual retainment, such that the wound up chain links are prevented from mutual displacement in the helical winding.

In the winding guide means 14, the chain links 12 first arriving are brought into engagement with a coupling member 18 shown in FIG. 3. While the advancing guide means 13, the winding guide means 14 and the drive means with the drive wheel 15 are placed in connection with one of the two objects, between which pressure and/or tensile as well as torque loads are to be transferred by means of the apparatus, the coupling member 18 serves for connecting the spindle device 16 with the other of the two objects. The drive means may alternatively, together with the coupling member, be positioned in connection with the second object.

Figure 5:
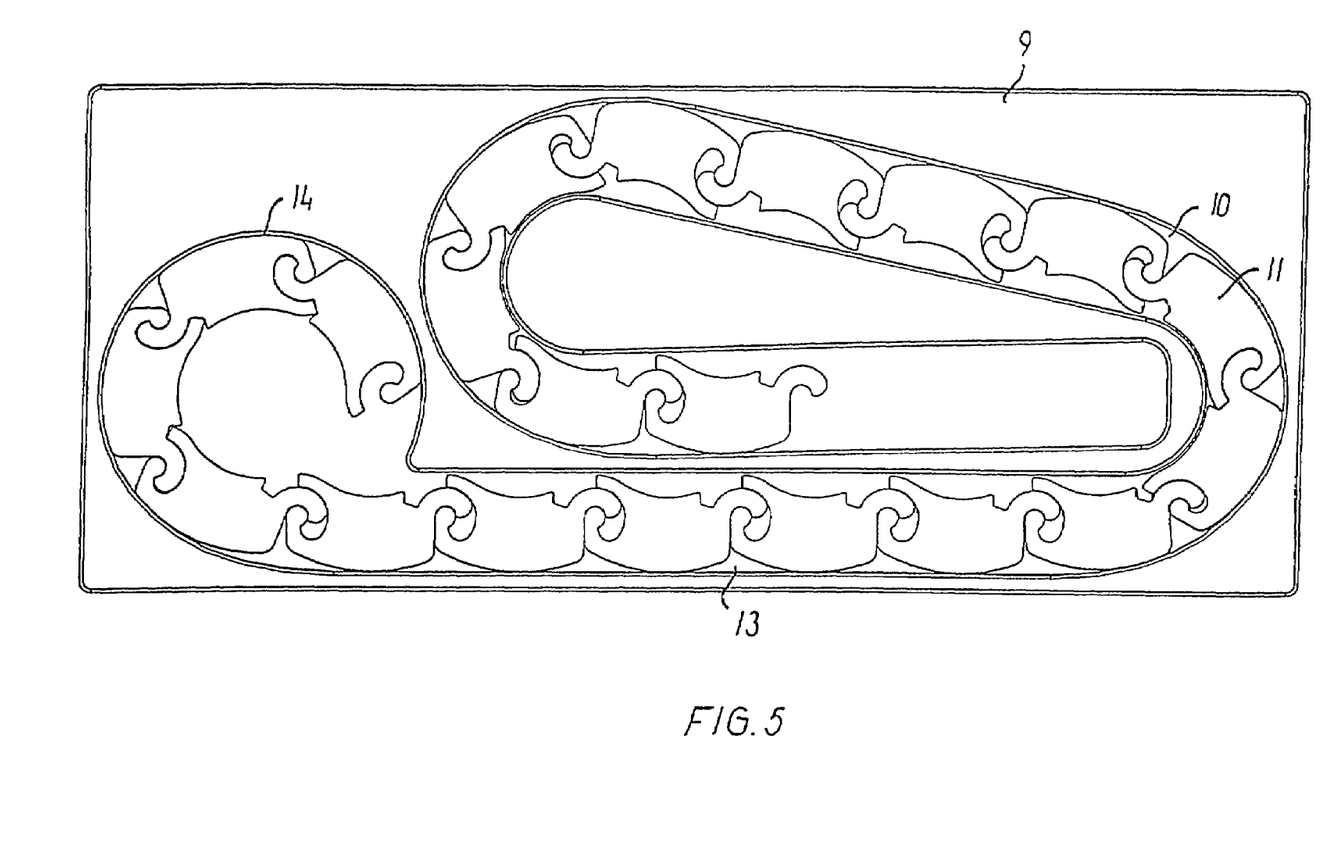
FIG. 5 shows and embodiment of the apparatus with integrated chain storage.

FIG. 5 shows, in a schematic plane view, how the winding up guide means 14 and the advancing guide means 13 may be integrated in a common housing 9 with a chain storage in the shape of a track 10, in which the elongate chain 11 is received in its entire length.

The advancing guide means 13 is in the embodiment shown designed as a linear rail member with a bottom surface 19 forming an elongate advancing guide surface for a convex exterior side of the interlocked chain links 12, and a superjacent guide rail 20 which by engagement with engagement means at a concave interior side of the chain links 12 guides them safely towards the winding up guide means 14.

Figure 6:
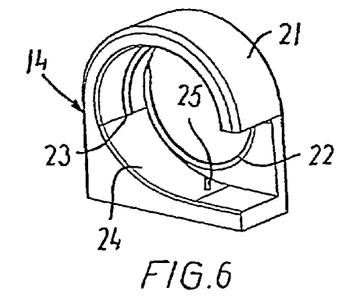
FIG. 6 is a perspective view of a winding guide means in the apparatus of FIGS. 3 and 4.

The winding up guide means 14 is in the embodiment shown in FIG. 6 formed with a substantially part-cylindrical wall 21, on the interior side of which a winding guide is formed by a thread-rib 22, which in the embodiment shown extends with a predetermined pitch across slightly more than 360° of the interior periphery of the wall 21. At one end 23 of the thread-rib 22, the interior side of the part-cylindrical wall 21 joins in a tangential plane in an extension 24 of the advancing guide surface 19. An advancing guide means 25 in the form of a protruding member for engagement with a track in the exterior side of the chain links 12 is connected with the advancing guide surface 24. This will be explained in detail in the following.

Figure 7:
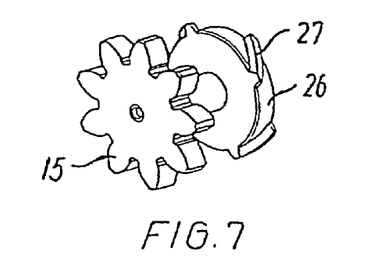
FIG. 7 is a perspective view of a drive means in the apparatus of FIGS. 3 and 4.
Figure 8:
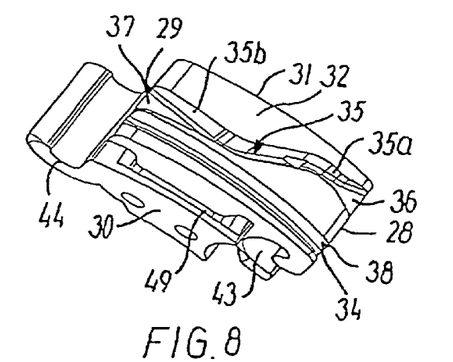
FIG. 8 is a first perspective view from the front and top of an embodiment of a chain link for use in the apparatus of FIGS. 3 and 4.
Figure 9:
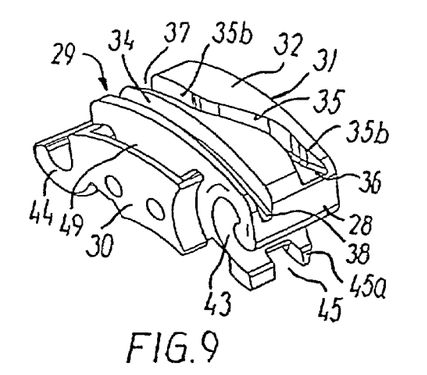
FIG. 9 is a perspective view from the front, top and right side of an embodiment of a chain link for use in the apparatus of FIGS. 3 and 4.

In the embodiment of the drive means shown in FIG. 7, the drive means 15 is connected with an advancing wheel 26 which is provided, in a peripheral surface, with a number of oblique teeth with a predetermined pitch directed oppositely to the pitch of the threaded groove 22 on the interior side of the cylindrical wall 21 in the winding guide means 14. As will be explained in detail in the following, the advancing wheel 26 with the teeth 27 engages, during winding up of the chain links 12, a helical track in the interior side of the chain links 12 and thereby brings about an axial advancement of the helical winding provided during winding-up under simultaneous rotation of the helical winding about its axis.

Figure 12:
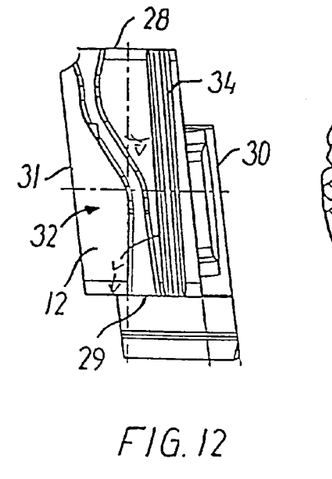
FIG. 12 is a second perspective view from the front and top of an embodiment of a chain link for use in the apparatus of FIGS. 3 and 4.

As will be seen from the projected view in FIG. 12, the individual chain links 12 have, in an unfolded projection, substantially the shape of a parallelogram with a first pair of opposite sides 28 and 29 and a second pair of opposite sides 30 and 31.

As more clearly seen in FIGS. 8–11 the chain links 12 have a substantially circular curvature with a convex exterior side 32 and a concave interior side 33 such that, when wound up, the chain links 12 form the substantially circular-cylindrical helical winding 16. To prevent joints between chain links 12 in the individual turns 17 in the helical winding 16 from being positioned diametrally opposite one another, the chains 12 have a length differing from an even circle fraction, preferably with an odd number of chain links 12 in each turn depending on the desired dimensions of the helical winding made. In practice, 5 chain links per turn have proved suitable for many purposes, such as will be most clearly seen from FIGS. 5 and 14.

For engagement with the winding guide in the winding guide means 14 formed by the thread-rib 22, a substantially linear track 34 is provided as a guide member in the convex exterior side 32 of each chain link, said track forming with the first pair of opposite sides 28 and 29 an angle v determined by the pitch angle of the thread-rib 22 relative to the axis of the part-cylindrical wall 21 of the winding guide means 14.

For engagement with the member 25 protruding as an advancing guide member from the extension 24 of the advancing guide surface, each chain link 12 comprises in the convex exterior side 32 as a second guide member a track 35 with two axially displaced track portions 35a and 35b which in each of a first pair of opposite sides 28 and 29 of the chain link 12 end in track orifices 36, 37 displaced in a direction parallel with the sides 28, 29. This design of the track brings each chain link 12 from the advancing guide surface 19, 24 into the winding guide means 14 with an axial displacement component and the orifice 38 of the track 34 at the downstream side 28 in the advancing direction, will be orientated against and aligned with the inlet end 23 of the thread-rib 22.

Figure 10:
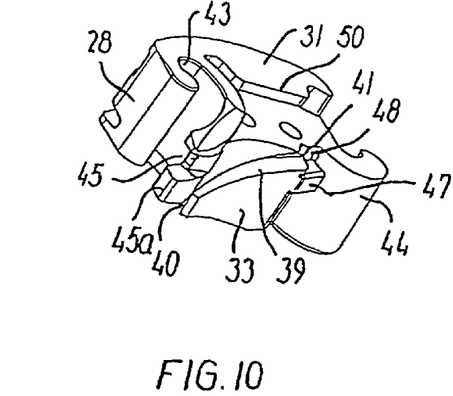
FIG. 10 is a perspective view from the rear, bottom and right side of an embodiment of a chain link for use in the apparatus of FIGS. 3 and 4.
Figure 11:
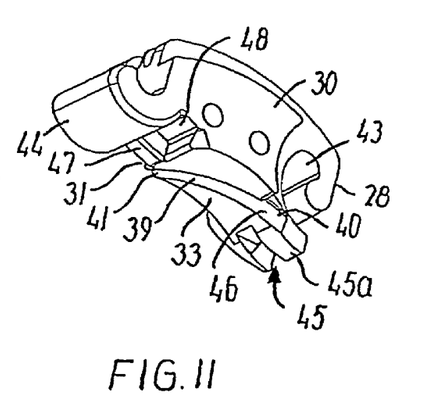
FIG. 11 is a perspective view from the front, bottom and left side of an embodiment of a chain link for use in the apparatus of FIGS. 3 and 4.

For engagement with the oblique teeth 27 on the advancing wheel 26 in the embodiment shown, a helical track 39 is provided in the concave interior side 33 of each chain link, as shown in FIGS. 10 and 11, said track being in the embodiment shown oriented substantially diagonally between track orifices 40 and 41 in each of the second pair of opposite sides 30 and 31. This form of the track has the effect that in the interior side of the wound up helical winding, a number of continuous, coherent helical tracks 42 is formed for engagement with each theirs of the corresponding number of oblique teeth 27 on the advancing wheel 26. If the drive means is alternatively connected with the coupling member 18, the interior tracks 39 may be dispensed with. Thereby, the chain links may ultimately be formed so as to substantially close the internal cavity of the spindle device to improve the rigidity and stability thereof.

For retaining the individual chain links 12 in their mutual positions in the turn 17 of the helical winding 16, each chain link 12 is provided with various pairs of co-operating engagement means.

Figure 14:
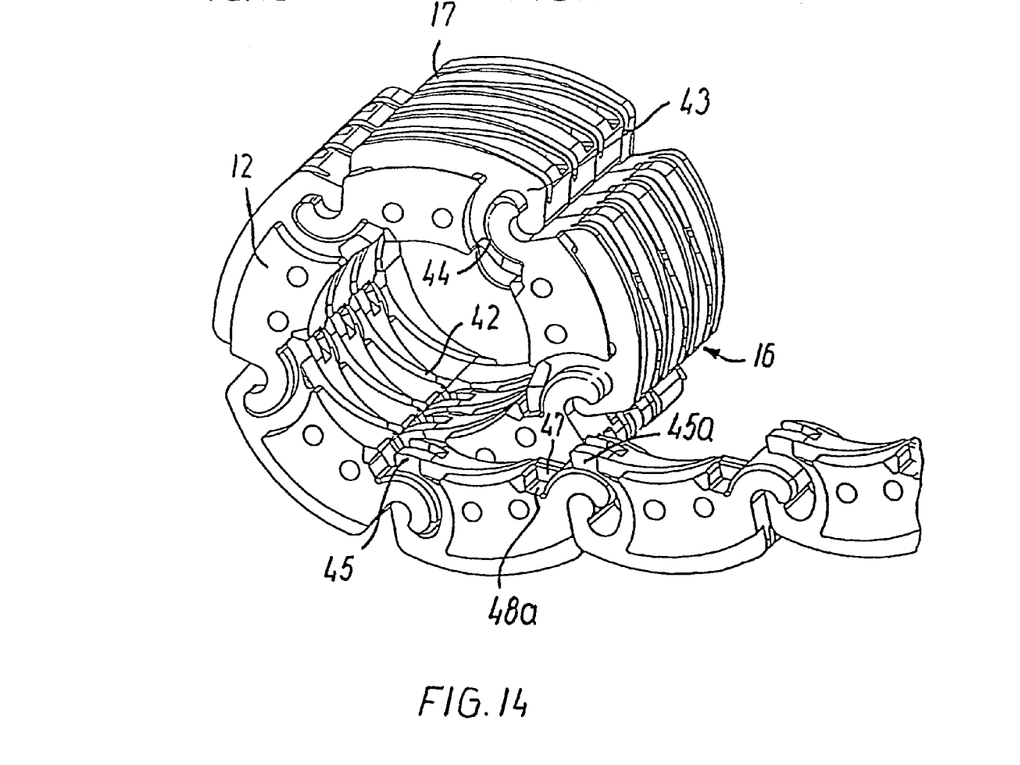
FIG. 14 is a perspective view illustrating the winding up of the interlocking chain links in a helical winding under mutual retainment.

Thus, a first pair of co-operating engagement means for connecting each chain link 12 with its neighbouring chain links comprises a curved track 43 and a hook-shaped hinge member 44 at each of the first pair of opposite sides 28 and 29 of the chain link. The shape of the track 43 and the hinge member received therein are adapted to one another and the track 43 has a depth, such that, in the wound up helical winding 16, the hinge member is pushed completely into the groove 43, as shown in FIG. 14.

A second pair of co-operating engagement means comprises a fork member 45 provided in the interior wall 46 of the curved track 43 and a rib member 47 provided at the interior side of the hook-shaped hinge member 44. By the engagement of the fork and rib members 45 and 47 with a rib member 47 and a fork member 45, respectively, on each of neighbouring chain links in the same turn, neighbouring chain links in the same turn 17 are prevented from mutual displacement in the axial direction of the helical winding produced.

On the interior side of the hook-shaped hinge member 44 abutment surfaces 48 for the branches 45a of the fork member 45 are further provided. Through the abutment of the fork branches 45a against the surfaces 48, the winding movement of the chain link 12 is stopped, such that neighbouring chain links in the same turn 17 are retained in their mutual angular position, which is determined by the number of chain links in the turn.

As shown in FIG. 3 the fork member 45 further serves as engagement member for the guide rail 20 in the advancing guide means 13.

As will appear from FIGS. 10, 11 and 14 the fork and rib members 45 and 47 on each chain link 12 are further axially displaced relative to one another. Hereby is attained that the curved track 43 in the entrance side 28 of each chain link at the winding in the helical winding, in addition to maintaining its engagement with the hook-shaped hinge member 44 on the previously introduced chain link 12, is brought into overlapping engagement with the hook-shaped hinge member 44 on the chain link in the turn formed immediately prior thereto in the helical winding 16, which is adjacent to this previously introduced chain link. This engagement has the effect that neighbouring turns 17 in the helical winding 16 are retained against mutual displacement in a plane perpendicular to the axial direction.

Finally, each of the chain links 12 is provided, at each of the second pair of opposite sides 30 and 31, with further engagement means which comprise a track 49 in the convex exterior side 32 of the chain link and a rib member 50 along one and the other side 30 and 31, respectively. By engagement of the track 49 and the rib member 50 with corresponding engagement means on adjacent chain links in neighbouring turns is ensured, by the winding-up of the chain links 12 in the helical winding, that chain links in neighbouring turns positioned side by side are secured in mutual engagement.

Figure 13:
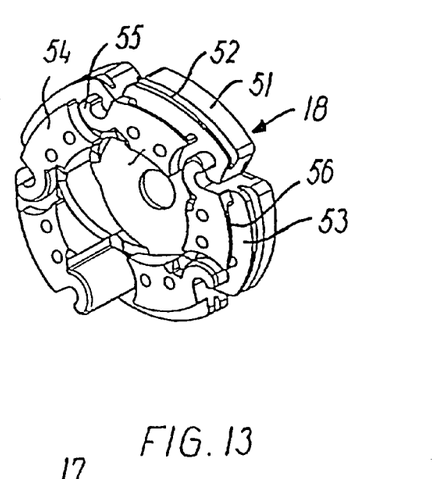
FIG. 13 is a perspective view of a first winding of interlocking chain links of the present invention connected to a coupling member.

The coupling member 18, with which the winding 17 first formed in the helical winding 16 is connected during the winding up of the chain link 12, is in the embodiment shown in FIG. 13 designed as a substantially disc-shaped cover member with a substantially circular-cylindrical edge surface 51, in which a track 52 is provided as a guide member for engaging the thread-rib 22 in the winding guide means 14, said track being substantially identical to the track 34 in the convex exterior side 32 of each chain link.

On the side surface 53 facing the helical winding 16, the coupling member 18 is provided with a number of protruding engagement means 54 corresponding to the number of chain links 12 in each turn of the helical winding 16, the height of said protruding engagement means 54 from side surface 53 increasing in accordance with the pitch of the wound up helical winding 16.

As the chain links 12, as mentioned above, are introduced in the winding guide means 14 with the side 28 with the curved track 43 in front and the side 31 with the rib member 50 facing outwards towards the coupling member 18, each of the engagement means 54 is provided with a hook-shaped hinge member 55 corresponding to the hook-shaped hinge member 44 on each chain link 12 and with an engagement track 56 for engagement with the rib member 50 on a chain link in the turn first formed.

By providing the chain links 12 and the coupling member 18 with the described co-operating engagement means, the chain links 12 will be safely secured and locked relative to each other in the wound up helical winding 16, which then together with the coupling member 18 provides a spindle device having considerable rigidity and high stability towards pressure and tensional load as well as towards bending, torsional and torque loads.

Figure 15:
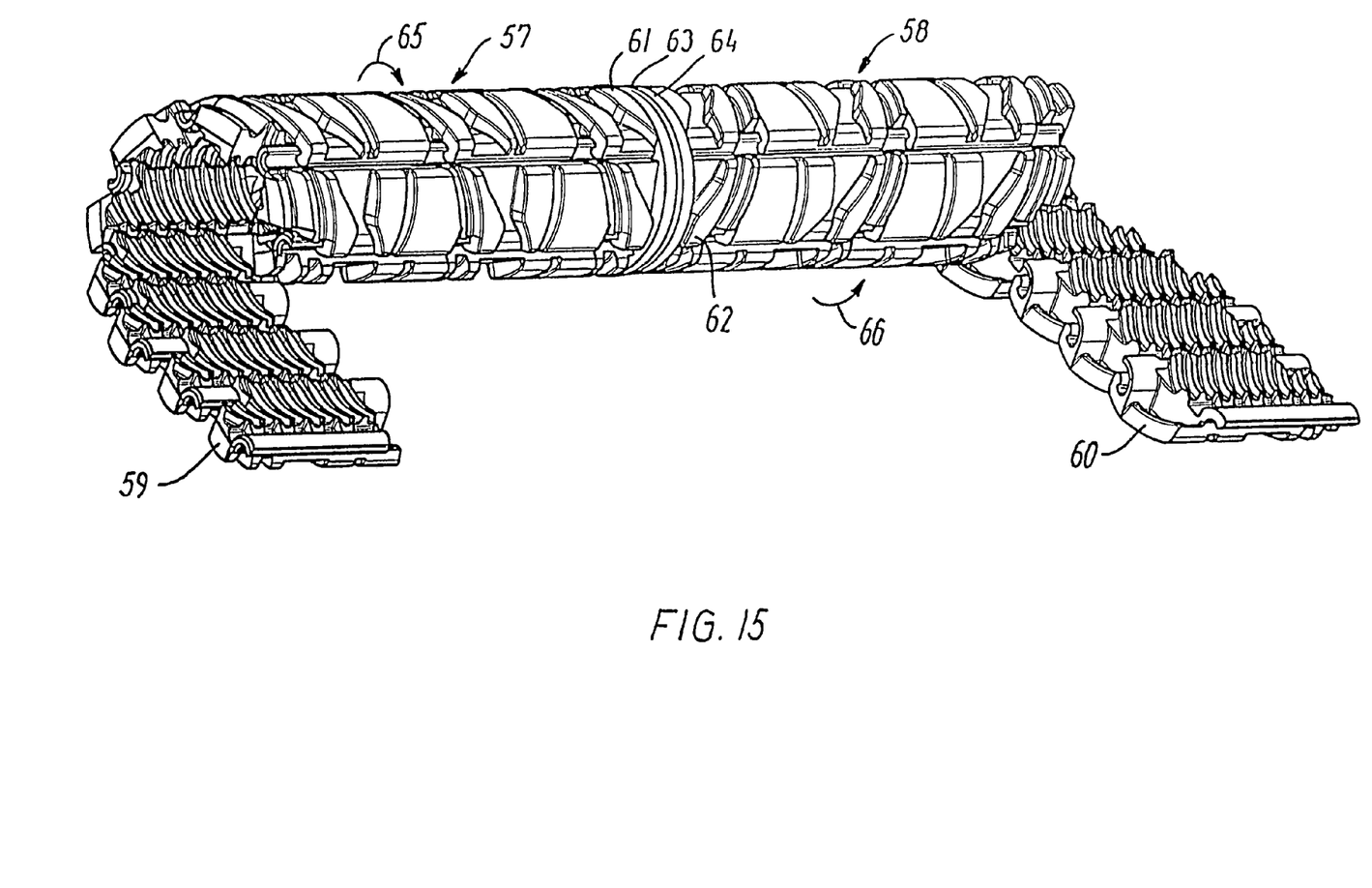
FIG. 15 is a schematical perspective view of a first alternative embodiment, in which two spindle members of equal diameter are formed by individual helical windings produced from individual sets of chain links.

In FIG. 15 an embodiment of the method an apparatus of the invention is illustrated, by which two spindle devices 57 and 58 are formed in linear extension of each other by winding-up chain links 59 and 60, respectively, from individual chains in separate helical windings having the same diameter. By provision of individual advancing guide means and winding guide means for the two spindle devices 57 and 58 at one and the other of the two objects to be interconnected, the chain storage needed to produce a given maximum length of the total spindle device may be evenly distributed between the two objects.

In each helical winding the first produced turn 61 and 62, respectively, is connected with a coupling member 63 and 64, respectively, which coupling members are connected with each other intermediate the two objects, which are not shown in FIG. 15.

The pitch direction of the helical windings of the two spindle devices 57 and 58 are opposite as illustrated by arrows 65 and 66, respectively, so that for the two opposite directions of revolution the length of both spindle devices 57 and 58 will either increase or decrease at the same time.

Figure 16:
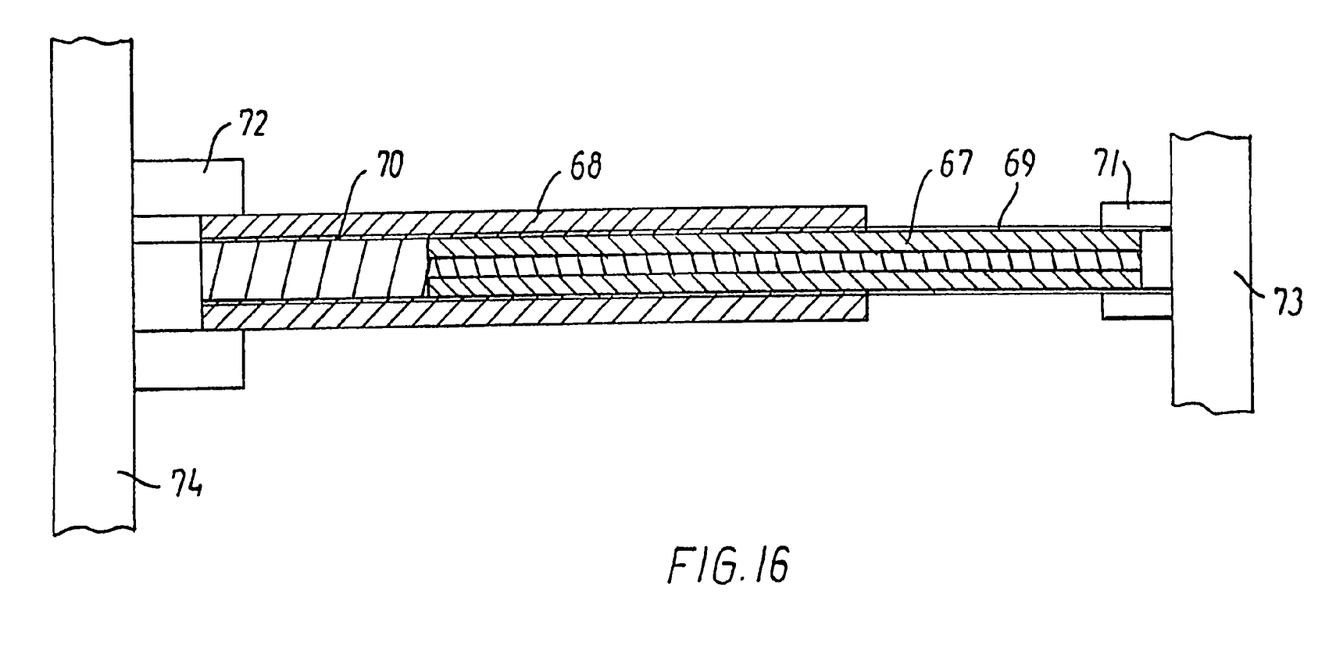
FIG. 16 is a schematical sectional view of a second alternative embodiment, in which two spindle members of different diameter are formed by individual helical windings produced from individual sets of chain links and extending one inside the other.

FIG. 16 shows another alternative embodiment, in which one spindle device 67 of two individual spindle devices 67 and 68 having opposite pitch directions to function in the same way as escribed above, is formed is formed with an external threading 69 engaging an internal threading 70 formed by the helical track in the interior side of the chain links of the other spindle device 68.

Also in this case, the advancing and winding guide means 71 and 72, respectively, for the helical windings of spindle devices 67 and 68 are provided at one and the other of the two objects 73 and 74 constituting e.g. main frame and sash members of an openable window, respectively, whereas each of spindle devices 67 and 68 functions as a coupling member for the other spindle device, so that separate coupling members for the first produced turn of each spindle device are dispensed with. By the simultaneous winding-up of the two spindle devices 67 and 68 from one and the other of the two objects, the spindle device 67 will simply gradually be screwed into the spindle device 68.

By this arrangement the rigidity and stability of the overall spindle resulting from the combination of the individual spindle devices 67 and 68 is further increased.

Figure 17:
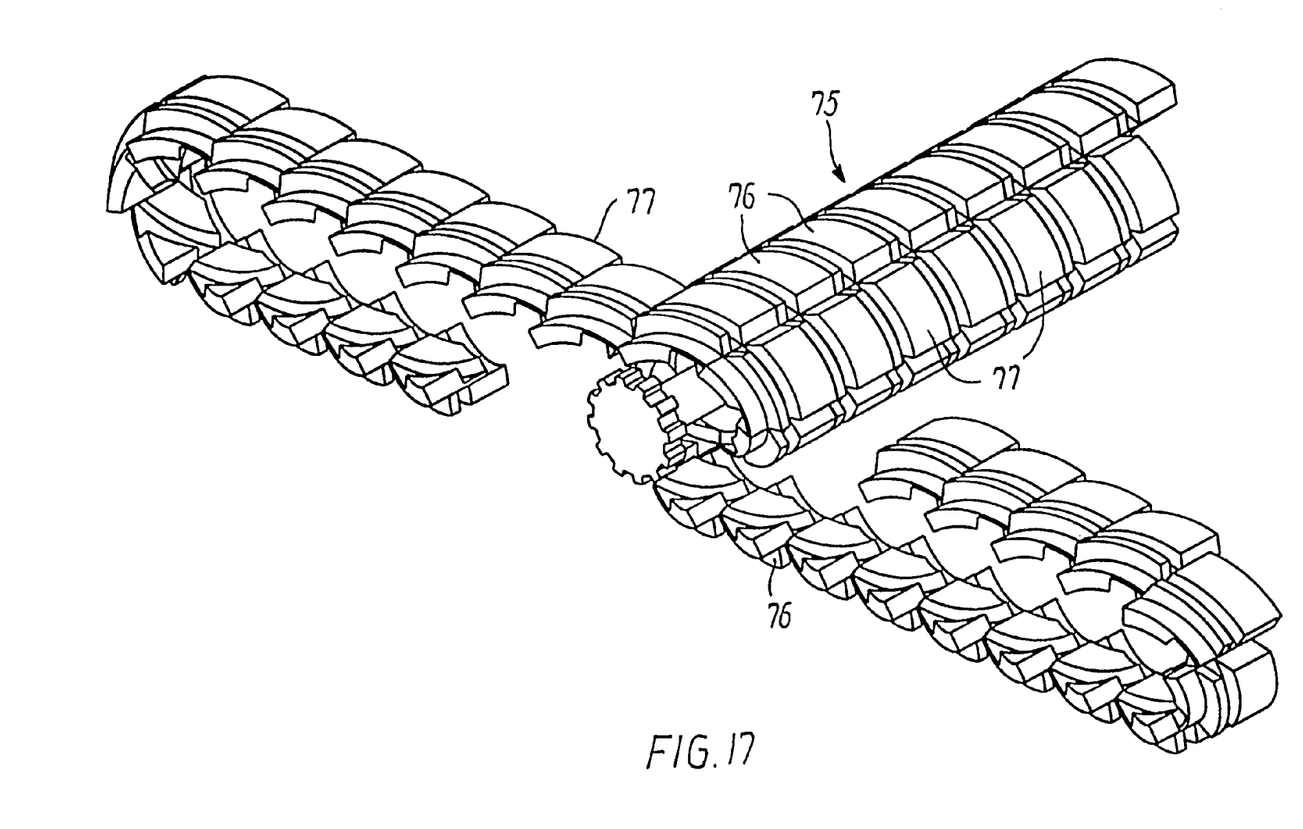
FIG. 17 is a schematical perspective view of an alternative embodiment, in which a single spindle device is formed from two individual sets of chain links.

FIG. 17 shows a further alternative embodiment, in which a single spindle device 75 is formed by winding-up two separate individual sets of chain links 76 an 77 in alternating turns of the helical winding. The two chains comprising links 76 and 77, respectively, are advanced towards a common winding guide means (not shown) of the same principal construction as shown in FIGS. 3 and 4 so as to enter the part cylindrical wall of the winding guide means at two points that are preferably diametrically opposite to each other. Compared to the embodiments described hereinbefore the winding guide means must have an internal threaded rib for each of the separate sets of chain links 76 and 77, each of said threaded ribs having a pitch and the form of the external tracks in the chain links corresponding to tracks 34 and 35 i FIGS. 8 and 9 being dimensioned to impart an axial displacement component to the chain links entering the winding guide means sufficient to allow the winding-up of chain links 72 and 73 in alternating turns.

By this alternating turn design of the spindle device the chain supply needed to produce a spindle device of a given length can be divided into two separate chains arranged on either side of the winding guide means. By use of the apparatus in a window operator this design will facilitate arrangement of the operator housing including the winding guide means in the middle of a main frame or sash member.

Figure 18:
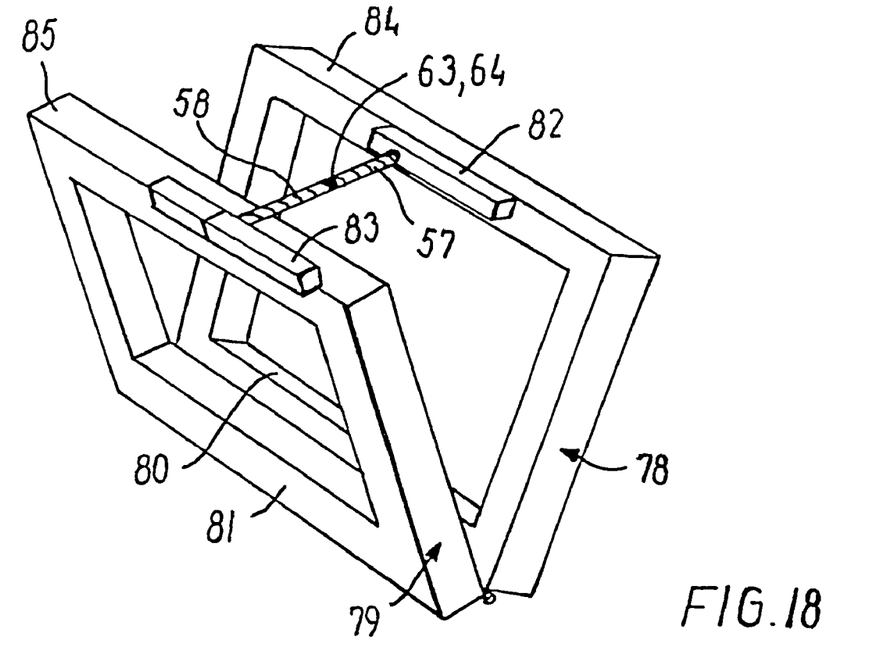
FIG. 18 is a perspective view of the application of the embodiment shown in FIG. 15 in a window operator device.

FIG. 18 shows an example of application of the embodiment schematically illustrated in FIG. 15 in an operator device for a window having a main frame 78 and an openable sash 79, which are pivotally connected with each other by hinge means (not illustrated) provided at opposed bottom members 80 and 81 of the main frame and sash structures. Operator housings 82 and 83 arranged on opposed top members 84 and 85 of the main frame and sash structures accommodate a chain storage with associated advancing guide means, winding guide means and drive means for the winding-up of chain links from each chain in the helical windings forming the two spindle devices 57 and 58, which are connected end by end by means of the coupling members 63 and 64.

It is within the scope of the invention possible to design the individual components of the apparatus in other ways. The number of chain links in each turn in the helical winding will thus depend on the dimensions of the spindle device suitable for the purpose in question. The coupling member connecting the spindle device with the second one of the two objects to be connected, may be connected with the helical winding in other ways, for instance as shown in FIG. 2 with a bushing member, fastened in the interior of the helical winding. Also the chain links may be designed in other ways, provided the functional conditions in respect of winding, axial advancement in the helical winding and mutual securing be met, the object of said conditions being to prevent relative movement between the individual chain links and between individual turns in the helical winding.

The invention claimed is:

1. A method of making at least one elongate spindle member having rigidity and stability against pressure and tensile loads as well as bending and torsional loads, whereby said spindle member acts between two objects, comprising the steps of:
   providing a plurality of mutually interlocking chain links (1, 12), said chain links each being formed with a substantially circular curvature on an exterior side thereof and including associated engagement means for mutual interlocking of the chain links,
   drivingly connecting said chain links to a rotatable driving device (3,4;15,26) arranged in at least one winding guide (14) connected with one of said two objects,
   operating said driving device to rotate said chain links in said winding guide, said winding guide guiding said chain links to form at least one helical winding (5, 16) which forms said elongate spindle member and advancing said spindle member along a longitudinal axis thereof, wherein each of the chain links in said elongate spindle member is interconnected and retained in engagement by its associated engagement means with at least one neighboring chain link of said plurality of chain links in the same turn of said elongate spindle member as well as an adjacent chain link of said plurality of chain links in at least one neighboring turn of said elongate spindle member, and
   coupling the helical winding with the other of said two objects by a coupling member (6,18).

2. A method according to claim 1, characterized by using a reversibly rotatable driving device (3,4; 15, 26) as said driving device to increase and reduce the length of the spindle member by rotation of said reversibly rotatable driving device in one and the other direction of rotation, respectively.

3. A method according to claim 2, characterized in that said coupling member (6, 18) is connected with the first produced turn of the helical winding.

4. A method according to claim 2, further comprising the steps of forming an additional elongate spindle member concurrently with said at least one spindle member by using an additional plurality of chain links and an additional winding guide for guiding said additional plurality of chain links to form an additional helical winding having a pitch direction opposite to a pitch direction of said at least one helical winding, said additional winding guide being connected with the other of said two objects.

5. A method according to claim 4, characterized in that the two helical windings (57, 58) have the same diameter, said additional helical winding includes an additional coupling member, and said coupling members (63, 64) are connected with each other intermediate said two objects.

6. A method according to claim 4, characterized in that one of said helical windings (67) is advanced inside the other of said helical windings (68) and said chain links of said one of said helical windings are provided with external threading (69) to engage internal threading (70) in the chain links of the other helical winding.

7. A method according to claim 2, characterized in that said spindle member is formed by winding said plurality of mutually interlocking chain links (76, 77) with an additional plurality of interlocking chain links in alternating turns in said winding guide.

8. A method according to claim 2, characterized by using the elongate spindle member to displace the two objects with respect to each other.

9. A method according to claim 2, wherein said two objects are constituted by a stationary frame structure and an openable sash structure and said method further comprises using said elongate spindle member to move said sash structure with respect to said frame structure.

10. An apparatus for carrying out the method according to claim 1, comprising, in connection with said one of said two objects, a chain storage (10) having an elongate chain (11) made of said plurality of mutually interlocking chain links (12) and having a guide means (13) for advancing the elongate chain (11) from said chain storage (10) to said at least one winding guide (14), the at least one winding guide comprising a guide element (22) which engages a guide member (34) on each of the chain links to wind said at least one helical winding (16), said rotatable driving device (3, 4; 15, 26) being rotatably arranged in said winding guide (14) for axial advancement of the spindle member produced by the at least one helical winding (5) and the coupling member (6,18).

11. An apparatus according to claim 10, characterized in that said coupling member (6,18) is connected with an end turn of the helical winding.

12. An apparatus according to claim 11, characterized in that said coupling member (18) comprises a substantially disc-shaped cover member with a substantially circular edge surface (51) in which a guide member (52) is provided for engagement with said guide element (22) in the winding guide (14), and the cover member is provided, on one side surface (53), with protruding engagement elements (54) for engagement with respective ones of said chain links (12) in the end turn (17) of the helical winding (16).

13. An apparatus according to claim 12, characterized in that said guide member in the edge surface (51) of the cover member comprises a track (52) for receiving said guide element (22) in the winding guide.

14. An apparatus according to claim 12, characterized in that said protruding engagement elements (54) comprise hook members (55).

15. An apparatus according to claim 12, characterized in that said protruding engagement elements each (54) comprise a groove (56).

16. An apparatus according to claim 11, further comprising an additional helical winding including an additional coupling member wherein the two helical windings (57, 58) have the same diameter and that said coupling members (63, 64) are connected with each other intermediate said two objects.

17. An apparatus according to claim 10, characterized in that the chain storage (10) comprises an elongate track connected with the advancing guide means (13), the elongate track for receiving the entire length of the chain (11).

18. An apparatus according to claim 10, characterized in that the winding guide (14) comprises a substantially part-cylindrical wall (21) having an interior supporting said guide element (22).

19. An apparatus according to claim 18, characterized in that the driving device comprises an advancing wheel (26) including peripheral surface with a number of oblique teeth (27) having a predetermined pitch directed opposite to a pitch of said guide element (22), said advancing wheel being journalled coaxially in the winding guide (14) for engagement with the chain links (12) and being connected with a drive wheel (15).

20. An apparatus according to claim 18, characterized in that said guide element comprises at least one thread-rib (22) having a predetermined pitch across part of the interior of said part-cylindrical wall (21).

21. An apparatus according to claim 20, characterized in that the advancing guide means (13) comprises a substantially linear guide rail (20) for controlled advancement of the chain links (12) towards the winding guide and a guide surface (19,24) connected substantially in a tangential plane with the interior of the part cylindrical wall (21) of the winding guide, said guide surface (19, 24) having at least one advancing guide member (25).

22. An apparatus according to claim 21, characterized in that the advancing guide member (25) comprises a member protruding from the guide surface (24) for introducing each said chain link (12) into the winding guide (14) while axially displacing each said chain link with respect to said winding guide.

23. An apparatus according to claim 22, further comprising an additional helical winding wherein one of said helical windings (67) is advanced inside the other of said helical windings (68) and said chain links of said one of said helical windings are provided with external threading (69) to engage internal threading (70) provided in chain links of the other helical winding (68).

24. An apparatus according to claim 10, characterized in that said helical winding (75) is formed by winding said chain links (76,77) in alternating turns with additional chain links.

25. An apparatus according to claim 12, characterized in that an additional a chain storage, an advancing guide and an additional winding guide are provided in connection with the other of said two objects for producing an additional elongate spindle member (57,58; 67, 68).

26. An apparatus according to claim 12, characterized in that the helical winding (5) is surrounded by a variable length casing (8).

27. An apparatus according to claim 12, characterized in that said casing is a bellows.

28. An apparatus according to claim 10 wherein each said chain link (12) has a substantially parallelogram shape with said engagement means comprising a first pair of engagement means (43, 44) for connection with at least one of said neighboring chain links in the same turn of the helical winding provided at a first pair of opposite sides (28, 29) thereof and a second pair of engagement means (49, 50) for engagement with a corresponding pair of said second pair of engagement means on one of said adjacent chain links at least one neighboring turn of the helical winding provided at a second pair of opposite sides (30, 31) thereof.

29. An apparatus according to claim 28, characterized in that each said guide member comprises a track (34) adapted to receive said guide element (22) in the winding guide.

30. An apparatus according to claim 29, characterized in that an interior side (33) of each chain link (12) is formed with engagement means (45) for engagement with a substantially linear guide rail (20) in the advancing guide means (13) and said exterior side of each chain link (12) is provided with a second guide member (35) for introducing the chain links (12) into the winding guide (14).

31. An apparatus according to claim 30, characterized in that each said second guide member (35) comprises a second track provided in said exterior side and ending in said first pair of opposite sides (28, 29) with track orifices (36,37).

32. An apparatus according to claim 30, characterized in that said guide rail engagement means (45) comprises one of a third pair of engagement means (45, 47) of each said chain link, each of said third pair of engagement means provided at said first pair of opposite sides (28, 29) of each said chain link.

33. An apparatus according to claim 32, characterized in that said one of said third pair of engagement means for each chain link (12) comprises a fork member (45) provided at a free edge of a wall portion defining one of said first pair of engagement means which comprises a curved track (43), said fork member for engagement, on one hand, with said guide rail (20) in the advancing guide means (13) and, on the other hand, with the other one of said third pair of engagement means on said neighboring chain link, each said other one of said third pair of engagement means comprising a rib member (47) provided in an interior side of the other one of said first pair of engagement means which comprises a hook-shaped hinge member (44), said fork and rib members (45, 47) preventing relative displacement of said neighboring chain links in the same turn in the axial direction of the helical winding when engaged, each said by hook-shaped hinge member (44) being provided, on each side of a respective one of said rib members (47), with abutment surfaces (48a, 48b) serving as stops for branches (45a) of a respective one of said fork members (45) for retaining said neighboring chain links in a predetermined angular position in said turn.

34. An apparatus according to claim 33, characterized in that said fork and rib members (45, 47) are positioned in such a way relative to one another that said curved tracks (43) of said chain links (12) are brought into engagement with said hook-shaped hinge members (44) of said chain links positioned in the same turn and the neighboring turn.

35. An apparatus according to claim 28, characterized in that a guide member (39) is formed in an interior side (33) of each chain link (12), each said guide member (39) comprising a helical track for engagement with oblique teeth (27) of an advancing wheel (26) of said driving device.

36. An apparatus according to claim 28, characterized in that the chain links (12) are molded from a plastics material.

37. An apparatus according to claim 28, characterized in that each chain link (12) has a length different from an even fraction of a circle having the radius of said helical winding.

38. An apparatus according to claim 37, characterized in that the length of each chain link (12) constitutes an odd fraction of said circle.

39. An apparatus according to claim 38, characterized in that the length of each chain link (12) constitutes a fifth of a peripheral length of an interior wall of the winding guide (14).

40. An apparatus according to claim 28, characterized in that said second pair of engagement means comprises a track (49) in the exterior side (32) of each of the chain links (12) and a rib member (50) along one of said second pair of opposite sides (30, 31) of each of said chain links, said rib members (50) being adapted to engage a groove (56) on said coupling member (18).

41. An apparatus according to claim 28, characterized in that the first pair of engagement means for each chain link (12) comprises a hook-shaped hinge member (44) and a curved track (43) , said curved tracks (43) being adapted to receive a hook member (55) of said coupling member (18).

42. An apparatus according to claim 28, characterized in that the chain links (12) are made as cast or sintered metal bodies.

43. A device for relative displacement of two objects with respect to each other comprising the apparatus according to claim 10.

44. An operator device for opening and closing a window comprising the apparatus according to claim 10.

* * * * *